(12) United States Patent
Bradbury et al.

(10) Patent No.: US 7,745,380 B2
(45) Date of Patent: *Jun. 29, 2010

(54) ADDITIVE FOR INCREASING THE DENSITY OF A FLUID FOR CASING ANNULUS PRESSURE CONTROL

(75) Inventors: Andrew J. Bradbury, Banchory (GB); Christopher A. Sawdon, Par (GB); Sonny Clary, Independence, LA (US); William M. Reid, Tomball, TX (US); Tom Heinz, Katy, TX (US)

(73) Assignee: M-I L.L.C., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/354,205

(22) Filed: Jan. 15, 2009

(65) Prior Publication Data

US 2009/0124521 A1   May 14, 2009

Related U.S. Application Data

(63) Continuation of application No. 10/274,528, filed on Oct. 18, 2002, now abandoned, which is a continuation-in-part of application No. 09/230,302, filed as application No. PCT/EP97/03802 on Jul. 16, 1997, now Pat. No. 6,586,372.

(30) Foreign Application Priority Data

Jul. 24, 1996   (GB) ................... 9615549.4

(51) Int. Cl.
*C08K 8/00*   (2006.01)
(52) U.S. Cl. .................... 507/219; 166/305.1
(58) Field of Classification Search ................. 507/219; 166/305.1
See application file for complete search history.

(56) References Cited

U.S. PATENT DOCUMENTS 2,003,701 A   6/1935   Stinson (Continued)

FOREIGN PATENT DOCUMENTS

DE   3709852   10/1988

(Continued)

OTHER PUBLICATIONS

Calcium bromide data sheet Aug. 2009.*

(Continued)

*Primary Examiner*—Randy Gulakowski
*Assistant Examiner*—Alicia M Toscano (57) ABSTRACT

A method of treating a wellbore that includes circulating a wellbore fluid in the wellbore, wherein the wellbore fluid comprises an oleaginous base fluid and a wellbore additive colloidal solid material, and wherein the wellbore additive colloidal solid material is formed by grinding a solid particulate material and a polymeric dispersing agent for a sufficient time so that the polymeric dispersing agent is absorbed to the surface of the resulting colloidal solid particles and less than 10% of the resulting colloidal solid particles have a diameter greater than 10 microns, but not more than five percent of the particles are less than 0.2 micron in diameter, wherein the grinding is carried out in the presence of an oleaginous base fluid and wherein the grinding is carried out so that the wellbore additive colloidal solid material has a weight average particle diameter $d_{50}$ less than 2.0 microns.

9 Claims, 1 Drawing Sheet

U.S. PATENT DOCUMENTS

| | | | |
|---|---|---|---|
| 2,556,169 A | | 6/1951 | Crouch et al. |
| 2,830,948 A | | 4/1958 | Popham |
| 3,065,172 A | | 11/1962 | Groves, Jr. et al. |
| 3,119,448 A | | 1/1964 | Rhoades |
| 3,408,296 A | | 10/1968 | Kuhn |
| 3,507,343 A | | 4/1970 | Gill |
| 3,634,235 A | | 1/1972 | Wilson et al. |
| 3,989,195 A | | 11/1976 | Falcon-Steward |
| 3,992,558 A | | 11/1976 | Smith-Johannsen et al. |
| 4,166,582 A | * | 9/1979 | Falcon-Steward ............ 241/16 |
| 4,217,229 A | | 8/1980 | Watson |
| 4,230,586 A | | 10/1980 | Bretz et al. |
| 4,269,700 A | | 5/1981 | White |
| 4,301,973 A | | 11/1981 | Lai |
| 4,325,514 A | | 4/1982 | Hemingsley |
| 4,369,843 A | | 1/1983 | Mondshine |
| 4,417,007 A | | 11/1983 | Salensky et al. |
| 4,664,841 A | | 5/1987 | Kitahara et al. |
| 4,702,116 A | | 10/1987 | Gawol et al. |
| 4,822,500 A | * | 4/1989 | Dobson et al. ............ 507/212 |
| 4,981,759 A | | 1/1991 | Nakatani et al. |
| 4,999,132 A | | 3/1991 | Canestri |
| 5,028,271 A | * | 7/1991 | Huddleston et al. ......... 106/720 |
| 5,065,946 A | | 11/1991 | Nishida et al. |
| 5,095,987 A | | 3/1992 | Weaver et al. |
| 5,117,909 A | | 6/1992 | Wilton et al. |
| 5,213,702 A | | 5/1993 | Nishida et al. |
| 5,307,938 A | | 5/1994 | Lillmars |
| 5,311,945 A | * | 5/1994 | Cowan et al. ............... 166/292 |
| 5,401,313 A | | 3/1995 | Supplee et al. |
| 5,415,228 A | | 5/1995 | Price et al. |
| 5,472,051 A | | 12/1995 | Brothers |
| 5,476,144 A | | 12/1995 | Nahm et al. |
| 5,504,062 A | | 4/1996 | Johnson |
| 5,518,996 A | | 5/1996 | Maroy et al. |
| 5,629,271 A | | 5/1997 | Dobson, Jr. et al. |
| 5,792,727 A | | 8/1998 | Jacobs |
| 5,826,669 A | | 10/1998 | Zaleski et al. |
| 5,910,467 A | | 6/1999 | Bragg |
| 5,948,733 A | | 9/1999 | Cawiezel et al. |
| 6,025,303 A | | 2/2000 | Keilhofer et al. |
| 6,153,562 A | | 11/2000 | Villar et al. |
| 6,248,698 B1 | | 6/2001 | Mullen et al. |
| 6,380,136 B1 | | 4/2002 | Bates et al. |
| 6,586,372 B1 | * | 7/2003 | Bradbury et al. ............ 507/140 |
| 6,764,980 B2 | * | 7/2004 | Bates et al. ................... 507/90 |
| 6,806,233 B2 | | 10/2004 | Patel |
| 6,821,326 B2 | | 11/2004 | Waldron et al. |
| 7,267,291 B2 | * | 9/2007 | Bradbury et al. ............ 241/16 |
| 2003/0235689 A1 | | 12/2003 | Rafaniello et al. |
| 2005/0101492 A1 | | 5/2005 | Bradbury et al. |
| 2006/0188651 A1 | | 8/2006 | Bradbury et al. |
| 2008/0064613 A1 | | 3/2008 | Massam |

FOREIGN PATENT DOCUMENTS

| | | |
|---|---|---|
| EP | 0119745 | 9/1984 |
| EP | 0164817 | 12/1985 |
| EP | 0621330 | 10/1994 |
| EP | 0673985 | 9/1995 |
| EP | 0786507 | 7/1997 |
| GB | 1414964 | 11/1976 |
| GB | 1472701 | 5/1977 |
| GB | 2055412 | 3/1981 |
| GB | 1599632 | 10/1981 |
| GB | 2089397 | 6/1982 |
| GB | 2185507 | 7/1987 |
| GB | 2216511 | 10/1989 |
| WO | 85/05118 | 11/1985 |
| WO | 98/03609 | 1/1998 |
| WO | WO 9803609 A1 * | 1/1998 |

OTHER PUBLICATIONS

"Decanting Centrifuges and Weighted Water Base Muds," Technical Bulletin, Geolograph Pioneer, pp. 111-122, No Date Available.

"Recommended Practice Standard Procedure for Laboratory Testing Drilling Fluids," API Recommended Practice 131, Fifth Edition, Jun. 1, 1995, pp. 6-7.

API Committee RP 13A Report, 1984, p. 19.

API Task Group on Barite Report, 1985, pp. 23-25.

Hayatdavoudi, A., "Drilling With a One-Step Solids-Control Technique," SPE Drilling Engineering, Mar. 1989, pp. 31-40.

International Search Report—International Application No. PCT/US03/32246—International Filing Date Oct. 14, 2003—Applicant M-I L.L.C.

Malachosky, Ed, "Hematite Adds Weight to Fluid Additive Controversy," Petroleum Engineer International, Jul. 1986, pp. 40-43.

Mohnot, Shantilal M., "Characterization and Control of Fine Particles Involved in Drilling," Journal of Petroleum Technology, Sep. 1985, pp. 1622-1632.

Ormsby, George S., "Understanding Solids Control Improves Drilling Efficiency," Petroleum Engineer International, Dec. 1981, pp. 120-130.

Rogers, Walter F., "Composition and Properties of Oil Well Drilling Fluids," Revised Edition, Gulf Coast Publishing Co., 1953, pp. 148-151.

Rogers, Walter F., et al., "Composition and Properties of Oil Well Drilling Fluids," Fourth Edition, Gulf Coast Publishing Co., 1980, pp. 8-11.

Sigma-Aldrich data sheets for Iron (II) oxide and Iron (II, III) oxide, 4 sheets.

Walker, C.O., "Alternative Weighting Material," Journal of Petroleum Technology, Dec. 1983, pp. 2158-2164.

* cited by examiner

ADDITIVE FOR INCREASING THE DENSITY OF A FLUID FOR CASING ANNULUS PRESSURE CONTROL

CROSS REFERENCE TO RELATED APPLICATIONS

This application is a continuation of U.S. application Ser. No. 10/274,528, filed Oct. 18, 2002, which is a continuation-in-part of U.S. application Ser. No. 09/230,302, filed Sep. 10, 1999, which is the U.S. national phase application under 35 U.S.C. 371 of a PCT International Application No. PCT/EP97/003,802, filed Jul. 16, 1997, which in turn claims priority under the Paris Convention to United Kingdom Patent Application No. 9615549.4 filed Jul. 24, 1996.

BACKGROUND OF THE INVENTION

In the offshore oil and gas production industry, there has been a long and unmet need for dealing with a problem known as sustained casing annulus pressure. Sustained casing annulus pressure can be defined as any recorded pressure on casing strings, other than drive or structural strings, that cannot be bled to zero. Causes of sustained casing annulus pressure include leaks in tubing, casing, packers, wellhead packoffs, and poor or failed primary cement jobs.

Controlling casing annulus pressure is a significant problem, especially in the offshore drilling environment. In those areas of the Gulf of Mexico which are federally regulated, the Minerals Management Service guidelines mandate zero pressure above the sea floor at all times, but do allow for certain types of non-compliant approval to maintain production or delay early abandonment. It has been reported that more than 8000 wells and 11,000 casing strings have been identified with sustained casing annulus pressure in the Gulf of Mexico alone. Of these reported cases, approximately 30% of these wells require special departure waivers issued by the Minerals Management Service to maintain production and all require continuous investment in either remediation or monitoring. Further in recent years, enforcement has become more restrictive and several operators have been forced to spend millions of dollars to solve this problem.

Sustained casing annulus pressure can also be a significant safety issue for oil and gas producing wells. In a recent report, approximately 150 Alaskan North Slope wells subject to casing annulus pressure buildup were shut-down by the operator out of safety concerns. This shut-down of considerable production capacity (reportedly about 6 percent of total crude output) was a safety precaution taken in response to the rupture and fire at a well caused by casing annulus pressure buildup.

One reported low cost method of controlling sustained casing annulus pressure is inserting a flexible hose into the restricted annuli of outer casing strings so high density fluids can be effectively displaced. Typically these high density fluids include high density brines specially formulated for injection and displacement of the existing fluids in the casing annulus. This displacement of the existing annulus fluid with a heavier (i.e. higher density) brine provides a simple way for an operator to regain control over sustained casing annulus pressures.

Common difficulties with the above method include inserting the flexible tubing to the desired depth without coiling and effectively displacing the existing casing annulus fluid with the desired heavy brine. Further, it should be appreciated that dilution of the injected fluid and corrosion caused by the high brine concentration are significant concerns. Furthermore, high density brines are expensive and pose additional health, safety and product handling concerns. Further it is known that heavy brines can cause a non-salt containing water based packer fluid to flocculate. This flocculation is reported to not allow the heavy brine to settle to the bottom of the casing string were it is desired. Replacement of the heavy brine solution with high density fluids of suspended solids (such a barite) is generally considered impractical because suspending the solids requires fluids of high viscosity which are not easily injected. Small diameter apertures present in the valves and other flow and pressure control equipment used to place casing annular fluids prevent the use of conventional weighting agents because these material block and plug the narrow restrictions. Despite the continued efforts in this area, there remains and exists an unmet need for fluids that exhibit a high density and do not exhibit the problems of solids settling or corrosion concerns.

SUMMARY OF THE INVENTION

The present invention is generally directed to fluids useful in controlling casing annulus pressure, as well as methods for making and methods of using such fluids. The fluids of the present invention include a polymer coated colloidal solid material that has been coated with a polymer added during the comminution (i.e. grinding) process for preparing the polymer coated colloidal solid material.

One illustrative embodiment of the present invention includes a method of controlling the pressure of a casing annulus in a subterranean well. In such an illustrative method, the method includes, injecting into the casing annulus a composition including a base fluid, and a polymer coated colloidal solid material. The polymer coated colloidal solid material includes: a solid particle having an weight average particle diameter ($d_{50}$) of less than two microns, and a polymeric dispersing agent absorbed to the surface of the solid particle. The polymeric dispersing agent is absorbed to the surface of the solid particle during the cominution (i.e. grinding) process utilized to make the polymer coated colloidal solid material. The base fluid utilized in the above illustrative embodiment can be an aqueous fluid or an oleaginous fluid and preferably is selected from: water, brine, diesel oil, mineral oil, white oil, n-alkanes, synthetic oils, saturated and unsaturated poly(alpha-olefins), esters of fatty acid carboxylic acids and combinations and mixtures of these and similar fluids that should be apparent to one of skill in the art. Suitable and illustrative colloidal solids are selected such that the solid particles are composed of a material of specific gravity of at least 2.68 and preferably are selected from barium sulfate (barite), calcium carbonate, dolomite, ilmenite, hematite, olivine, siderite, strontium sulfate, combinations and mixtures of these and other suitable materials that should be well known to one of skill in the art. In one preferred and illustrative embodiment, the polymer coated colloidal solid material has a weight average particle diameter ($d_{50}$) less than 2.0 microns. Another preferred and illustrative embodiment is such that at least 50% of the solid particles have a diameter less than 2 microns and more preferably at least 80% of the solid particles have a diameter less than 2 microns. Alternatively, the particle diameter distribution in one illustrative embodiment is such that greater than 25% of the solid particles have a diameter of less than 2 microns and more preferably greater than 50% of the solid particle have a diameter of less than 2 microns. The polymeric dispersing agent utilized in one illustrative and preferred embodiment is a polymer of molecular weight of at least 2,000 Daltons. In another more preferred and illustrative embodiment, the polymeric dispersing agent is a water soluble polymer is a homopolymer or copolymer of monomers selected from the group comprising: acrylic acid, itaconic acid, maleic acid or anhydride, hydroxypropyl acrylate vinylsulphonic acid, acrylamido 2-propane sulphonic acid, acrylamide, styrene sulphonic acid, acrylic phosphate esters, methyl vinyl ether and vinyl acetate, and wherein the acid monomers may also be neutralized to a salt.

The present invention is also directed to a composition that includes a base fluid and a polymer coated colloidal solid material. The polymer coated colloidal solid material is formulated so as to include a solid particle having an weight average particle diameter ($d_{50}$) of less than two microns; and a polymeric dispersing agent absorbed to the surface of the colloidal solid particle.

In addition to the above, the present invention is directed to a method of making the polymer coated colloidal solid materials utilized and described herein. Such an illustrative method includes grinding a solid particulate material and a polymeric dispersing agent for a sufficient time to achieve an weight average particle diameter ($d_{50}$) of less than two microns; and so that the polymeric dispersing agent is absorbed to the surface of the solid particle. Preferably the illustrative grinding process is carried out in the presence of a base fluid that is either an aqueous fluid or an oleaginous fluid.

These and other features of the present invention are more fully set forth in the following description of preferred or illustrative embodiments of the invention.

BRIEF DESCRIPTION OF THE DRAWINGS

The description is presented with reference to the accompanying drawing which is a graphical representation of the particle diameter distribution of the colloidal barite of the present invention compared to that of API barite.

DESCRIPTION OF ILLUSTRATIVE EMBODIMENTS

One of the most important functions of a fluid of the present invention is to contribute to the stability of the well bore, and control the flow of gas, oil or water from the pores of the formation in order to prevent, for example, the flow or blow out of formation fluids or the collapse of pressured earth formations. The column of fluid in the hole exerts a hydrostatic pressure proportional to the depth of the hole and the density of the fluid. High pressure formations may require a fluid with a specific gravity of up to 3.0.

A variety of materials are presently used to increase the density of fluids in the oil and gas well drilling and production industry. Such materials include dissolved salts such as sodium chloride, calcium chloride and calcium bromide. Alternatively powdered minerals such as barite, calcite and hematite are added to a fluid to form a suspension of increased density. It is also known to utilize finely divided metal such as iron as a weight material. In this connection, PCT Patent Application WO85/05118 discloses a drilling fluid where the weight material includes iron/steel ball-shaped particles having a diameter less than 250 microns and preferentially between 15 and 75 microns. It has also been proposed to use calcium or iron carbonate (see for example U.S. Pat. No. 4,217,229).

One desirable characteristic of the fluids utilized in the context of the present invention is that the particles form a stable suspension, and do not readily settle out. A second desirable characteristic is that the suspension should exhibit a low viscosity in order to facilitate pumping and to minimize the generation of high pressures. Another desirable characteristic is that the fluid slurry should exhibit low filtration rates (fluid loss).

Conventional weighting agents such as powdered barium sulfate ("barite") exhibit an average particle diameter ($d_{50}$) in the range of 10-30 microns. It should be well known to one of skill in the art that properties of conventional weighting agents, and barite in particular are subject to strict quality control parameters established by the American Petroleum Institute (API). To suspend these materials adequately requires the addition of a gellant or viscosifier such as bentonite for water based fluids, or organically modified bentonite for oil based fluids. Polymeric viscosifiers such as xanthan gum may be also added to slow the rate of the sedimentation of the weighting agent. However, one of skill in the art should appreciate that as more gellant is added to increase the suspension stability, the fluid viscosity (plastic viscosity) increases undesirably resulting in reduced pumpability.

The sedimentation (or "sag") of particulate weighting agents is important for maintaining or controlling pressures in a wellbore, a wellbore annulus or casing annuli. Should there be a gradual separation of the solid and liquid phases of a fluid over a period of time, the density of the fluid in the wellbore, the annulus or casing annulus becomes inhomogeneous and the hydrostatic pressure exerted on the wellbore formations may be less than the pressure of wellbore formation fluids, resulting in well control issues and potentially a blow out.

This is no less important in deep high pressure wells where high density fluids may be required to control the casing annulus pressure. Again, the stability of the suspension is important in order to maintain the hydrostatic head to avoid a blow out. One of skill in the art should understand and appreciate that the two objectives of having a low viscosity fluid that is readily pumped into the casing annulus plus minimal sag of any weighting material present can be difficult to reconcile.

It is known that reduced particle sedimentation rates can be obtained by reducing the particle size used. However, the conventional view in the drilling industry is that reducing the particle size causes an undesirable increase in viscosity. The increase in viscosity is reported in the literature as being caused by an increase in the surface area of the particles causing increased adsorption of water and thus a thickening of the suspension. For example, "Drilling and Drilling Fluids" Chilingarian G. V. and Vorabutor P. 1981, pages 441-444 states: "The difference in results (i.e. increase in plastic viscosity) when particle size is varied in a mud slurry is primarily due to magnitude of the surface area, which determines the degree of adsorption (tying up) of water. More water is adsorbed with increasing area." The main thrust of the teachings is that colloidal fines due to their nature of having a high surface area to volume ratio will adsorb significantly more water and so decrease the fluidity of the mud. The same argument or concept is presented in "Drilling Practices Manual" edited by Moore pages 185-189 (1986).) Walter F Rogers in "Composition and Properties of Oil Well Drilling Fluids" in pp 148-151 (1953) presents the same argument where the higher the number of barite particles per gram (hence particle size), the higher and more detrimental the viscosity. Malachosky in Petroleum Engineer International, July 1986 pp 40-43 discusses the detrimental influence on fluid properties of colloidal barite, and high treatment costs because of the high surface area. This understanding that small particle size is detrimental is well known in the prior art and is reflected and illustrated by the API specification for barite as a drilling fluid additive which limits the particle content % w/w below 6 microns to 30% maximum in order to minimize viscosity increases. Further as is illustrated on page 190 of "Drilling Practices Manual" edited by Moore, which has a bar graph showing that the percent by weight of particle below 2 microns (i.e. colloidal solids) for API barite is less than 15% in all cases shown.

It is therefore very surprising that the products of this invention, which comprise particles very finely ground to an average particle diameter ($d_{50}$) of less than two microns, provide fluids of reduced plastic viscosity in combination with greatly reducing sedimentation or sag.

The additives of this invention comprise dispersed solid colloidal particles with a weight average particle diameter ($d_{50}$) of less than 2 microns that are coated with a polymeric deflocculating agent or dispersing agent. The fine particle size will generate suspensions or slurries that will show a reduced tendency to sediment or sag, whilst the polymeric dispersing agent on the surface of the particle control the inter-particle interactions and thus will produce lower rheological profiles. It is the combination of fine particle size and control of colloidal interactions that reconciles the two objectives of lower viscosity and minimal sag.

According to the present invention, the polymeric dispersant is coated onto the surface of the particulate weighting during the grinding process utilized to form the colloidal particle. It is believed that during the course of the grinding process, newly exposed particle surfaces become polymer coated thus resulting in the properties exhibited by the colloidal solids of the present invention. Experimental data has shown that colloidal solid material created in the absence of the polymeric dispersant results in a concentrated slurry of small particles that is an unpumpable paste or gel. According to the teachings of the present invention, a polymeric dispersant is added during the grinding process. It is believed that this difference provides an advantageous improvement in the state of dispersion of the particles compared to post addition of the polymeric dispersant to fine particles. According to a preferred embodiment, the polymeric dispersant is chosen so as it provides the suitable colloidal inter-particle interaction mechanism to make it tolerant to a range of common wellbore contaminants, including salt saturated.

A method of grinding a solid material to obtain the solid colloidal particle so of the present invention is well known for example from British Patent Specification No 1,472,701 or No 1,599,632. The mineral in an aqueous suspension is mixed with a polymeric dispersing agent and then ground within an agitated fluidized bed of a particulate grinding medium for a time sufficient to provide the required particle size distribution. An important preferred embodiment aspect of the present invention is the presence of the dispersing agent in the step of "wet" grinding the mineral. This prevents new crystal surfaces formed during the grinding step from forming agglomerates which are not so readily broken down if they are subsequently treated with a dispersing agent.

According to a preferred embodiment of the present invention, the weighting agent of the present invention is formed of particles that are composed of a material of specific gravity of at least 2.68. Materials of specific gravity greater than 2.68 from colloidal solid particles that embody one aspect of the present invention include one or more materials selected from but not limited to barium sulfate (barite), calcium carbonate, dolomite, ilmenite, hematite or other iron ores, olivine, siderite, strontium sulfate. Normally the lowest wellbore fluid viscosity at any particular density is obtained by using the highest density colloidal particles. However other considerations may influence the choice of product such as cost, local availability and the power required for grinding.

A preferred embodiment of this invention is for the weight average particle diameter ($d_{50}$) of the colloidal solid particles to be less than 2.0 microns. Another preferred and illustrative embodiment is such that at least 50% of the solid particles have a diameter less than 2 microns and more preferably at least 80% of the solid particles have a diameter less than 2 microns. Alternatively, the particle diameter distribution in one illustrative embodiment is such that greater than 25% of the solid particles have a diameter of less than 2 microns and more preferably greater than 50% of the solid particle have a diameter of less than 2 microns. This will enhance the suspension's characteristics in terms of sedimentation or sag stability without the viscosity of the fluid increasing so as to make it unpumpable.

The polymer coated colloidal particles according the invention may be provided as a concentrated slurry either in an aqueous medium or an oleaginous liquid. In the latter case, the oleaginous liquid should have a kinematic viscosity of less than 10 centistokes (10 mm$^2$/s) at 40° C. and, for safety reasons, a flash point of greater than 60° C. Suitable oleaginous liquids are for example diesel oil, mineral or white oils, n-alkanes or synthetic oils such as alpha-olefin oils, ester oils or poly(alpha-olefins).

Where the polymer coated colloidal particles are provided in an aqueous medium, the dispersing agent may be, for example, a water-soluble polymer of molecular weight of at least 2,000 Daltons. The polymer is a homopolymer or copolymer of any monomers selected from (but not limited to) the class comprising acrylic acid, itaconic acid, maleic acid or anhydride, hydroxypropyl acrylate vinylsulphonic acid, acrylamido 2-propane sulphonic acid, acrylamide, styrene sulphonic acid, acrylic phosphate esters, methyl vinyl ether and vinyl acetate. The acid monomers may also be neutralized to a salt such as the sodium salt.

It has been found that when the dispersing agent is added during the combination process (i.e. grinding), intermediate molecular weight polymers (in the range 10,000 to 200,000 for example) may be used effectively. Intermediate molecular weight dispersing agents are advantageously less sensitive to contaminants such as salt, clays, and therefore are well adapted to wellbore fluids.

Where the colloidal particles are provided in an oleaginous medium, the dispersing agent may be selected for example among carboxylic acids of molecular weight of at least 150 such as oleic acid and polybasic fatty acids, alkylbenzene sulphonic acids, alkane sulphonic acids, linear alpha-olefin sulphonic acid or the alkaline earth metal salts of any of the above acids, phospholipids such as lecithin, synthetic polymers such as Hypermer OM-1 (trademark of ICI).

This invention has a surprising variety of applications in drilling fluids, cement and cementing fluids, spacer fluids, other high density fluids and coiled tubing drilling fluids as well as the uses of the methods of the present invention in controlling casing annulus pressure. The new particulate weighting agents have the ability to stabilize the laminar flow regime, and delay the onset of turbulence. It is possible to formulate fluids for several applications that will be able to be pumped faster before turbulence is encountered, so giving essentially lower pressure drops at equivalent flow rates. This ability to stabilize the laminar flow regime although surprising is adequately demonstrated in heavy density muds of 20 pounds per gallon (2.39 g/cm$^3$) or higher. Such high density muds using conventional weighting agents, with a weight average particle diameter of 10 to 30 μm, would exhibit dilatancy with the concomitant increase in the pressure drops due to the turbulence generated. The ability of the new weighting agent to stabilize the flow means that high density fluids with acceptable rheology are feasible with lower pressure drops.

The fluids of the present invention may also be used in non-oilfield applications such as dense media separating fluid (to recover ore for example) or as a ship's ballast fluid.

The following examples are to illustrate the properties and performance of the wellbore fluids of the present invention though the invention is not limited to the specific embodiments showing these examples. All testing was conducted as per API RP 13 B where applicable. Mixing was performed on Silverson L2R or Hamilton Beach Mixers. The viscosity at various shear rates (RPM's) and other Theological properties were obtained using a Fann viscometer. Mud weights were checked using a standard mud scale or an analytical balance. Fluid loss was measured with a standard API fluid loss cell In expressing a metric equivalent, the following U.S. to metric conversion factors are used: 1 gal=3.785 liters; 1 lb.=0.454 kg; 1 lb./gal (ppg)=0.1198 g/cm$^3$; 1 bbl=42 gal; 1 lb./bbl (ppb)=2.835 kg/m$^3$; 1 lb/100 ft$^2$=0.4788 Pa.

These tests have been carried out with different grades of ground barite: a standard grade of API barite, having a weight average particle diameter ($D_{50}$) of about 20 microns; a untreated barite (M) having an average size of 3-5 microns made by milling/grinding barite while in the dry state and in the absence of a dispersant, with and colloidal barite according the present invention (with a $D_{50}$ from 0.5 microns to 2.0 microns), with a polymeric dispersant included during a "wet" grinding process.

Figure 1:
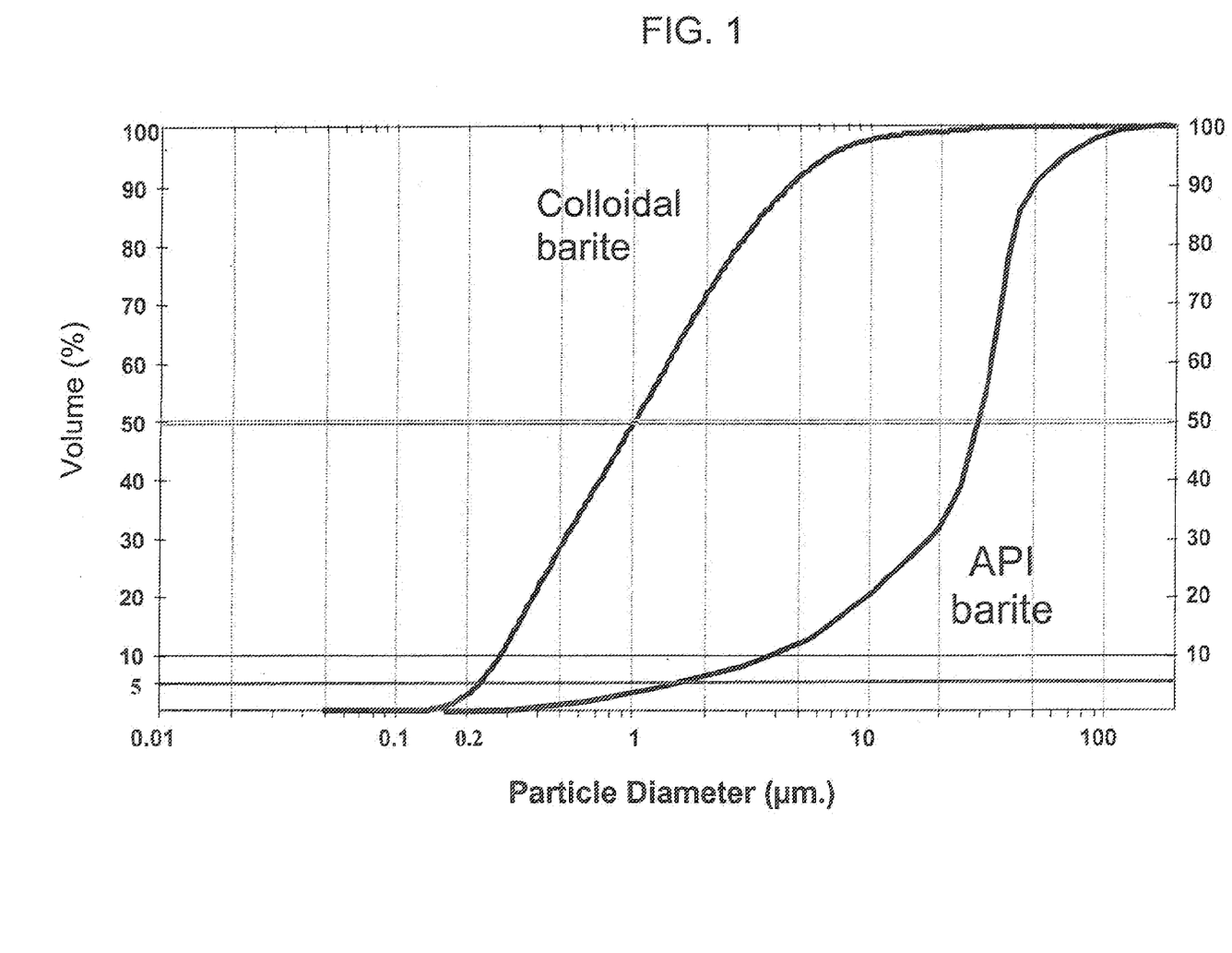

The corresponding particle size distributions are shown FIG. 1. As shown in FIG. 1, one of skill in the should understand and appreciate that the colloidal barite of the present invention has a particle size distribution that is very different from that of API barite. Specifically one should be able to determine that greater than about 90% (by volume) of the colloidal barite of the present invention has a particle diameter less than about 5 microns. In contrast, less than 15 percent by volume of the particles in API specification barite have a particle diameter less than 5 microns.

The polymeric dispersant is IDSPERSE™ XT an anionic acrylic ter-polymer of molecular weight in the range 40,000-120,000 with carboxylate and other functional groups commercially available from M-I LLC. Houston, Tex. This preferred polymer is advantageously stable at temperature up to 200° C., tolerant to a broad range of contaminant, gives good filtration properties and do not readily desorb off the particle surface.

EXAMPLE 1

22 ppg [2.63 g/cm$^3$] fluids based on barium sulfate and water were prepared using standard barite and colloidal barite according to the invention. The 22 ppg slurry of API grade barite and water was made with no gelling agent to control the inter-particle interactions (Fluid #1). Fluid #2 is also based on standard API barite but with a post-addition of two pounds per barrel (5.7 kilograms per cubic meter) IDSPERSE XT. Fluid #3 is 100% new weighting agent with 67% w/w of particles below 1 micron in size and at least 90% less than 2 microns. The results are provided in table I.

TABLE I

| # | Viscosity at various shear rates (rpm of agitation): Dial reading or "Fann Units" for: | | | | | | Plastic Viscosity | Yield Point lb/100 ft$^2$ |
|---|---|---|---|---|---|---|---|---|
|   | 600 rpm | 300 rpm | 200 rpm | 100 rpm | 6 rpm | 3 rpm | mPa · s | (Pascals) |
| 1 | 250 | 160 | 124 | 92 | 25 | 16 | 90 | 70 (34) |
| 2 | 265 | 105 | 64 | 26 | 1 | 1 | 160 | −55 (−26) |
| 3 | 65 | 38 | 27 | 17 | 3 | 2 | 27 | 11 (5) |

For Fluid #1 the viscosity is very high and the slurry was observed to filter very rapidly. (If further materials were added to reduce the fluid loss, the viscosity would have increased yet further). This system sags significantly over one hour giving substantial free water (ca. 10% of original volume).

Post addition of two pounds per barrel [5.7 kg/cm$^3$] of IDSPERSE XT to conventional API barite (Fluid #2) reduces the low shear rate viscosity by controlling the inter-particle interactions. However due to the particle concentration and average particle size the fluid exhibits dilatancy, which is indicated by the high plastic viscosity and negative yield point. This has considerable consequences on the pressure drops for these fluids while pumping. That is to say the ability to pump this fluid is substantially reduced due to the high viscosity. The fluid #2 sags immediately on standing.

By contrast, Fluid #3 exhibits an excellent, low, plastic viscosity. The presence of the dispersing polymer controls the inter-particle interactions, so making fluid #3 pumpable and not a gel. Also the much lower average particle size has stabilized the flow regime and is now laminar at 1000 s$^{-1}$ demonstrated by the low plastic viscosity and positive yield point.

EXAMPLE 2

Experiments were conducted to examine the effect of the post addition of the chosen polymer dispersant to a slurry comprising weighting agents of the same colloidal particle size. A milled barite ($D_{50}$~4 um) and a milled calcium carbonate (70% by weight of the particles of less than 2 μm) were selected, both of which are of similar particle size to the invention related herein. The slurries were prepared at an equivalent particle volume fraction of 0.282 and compared to the product of the present invention (new barite). See table II.

The rheologies were measured at 120° F. (49° C.), thereafter an addition of 6 ppb (17.2 kg/m$^3$) IDSPERSE XT was made. The rheologies of the subsequent slurries were finally measured at 120° F. (see table III) with additional API fluid loss test.

TABLE II

| # | Material | Dispersant | Density (ppg) | Volume Fraction | wt/wt |
|---|---|---|---|---|---|
| 4 | New barite | while grinding | 16.0 [1.92 g/cm$^3$] | 0.282 | 0.625 |
| 5 | Milled barite | none | 16.0 [1.92 g/cm$^3$] | 0.282 | 0.625 |

TABLE II-continued

| # | Material | Dispersant | Density (ppg) | Volume Fraction | wt/wt |
|---|---|---|---|---|---|
| 6 | Milled barite | post-addition | 16.0 [1.92 g/cm³] | 0.282 | 0.625 |
| 7 | Calcium Carbonate | none | 12.4 [1.48 g/cm³] | 0.282 | 0.518 |
| 8 | Calcium Carbonate | post-addition | 12.4 [1.48 g/cm³] | 0.282 | 0.518 |

TABLE III

| # | Viscosity at various shear rates (rpm of agitation): Dial reading or "Fann Units" for: | | | | | | Plastic Viscosity mPa·s | Yield Point lb/100 ft² | API Fluid Loss |
|---|---|---|---|---|---|---|---|---|---|
| | 600 rpm | 300 rpm | 200 rpm | 100 rpm | 6 rpm | 3 rpm | | | |
| 4 | 12 | 6 | 4 | 2 | | | 6 | 0 | 11 |
| 5 | os | os | os | os | os | os | | | |
| 6 | 12 | 6 | 4 | 2 | | | 6 | 0 | total[1] |
| 7 | os | os | 260 | 221 | 88 | 78 | | | |
| 8 | 12 | 6 | 4 | 3 | 1 | 1 | 6 | 0 | total[2] |

[1] total fluid loss in 26 minutes;
[2] total fluid loss in 20 minutes

No filtration control is gained from post addition of the polymer as revealed by the total fluid loss in the API test.

One of skill in the art should appreciate and know that the performance parameters of major importance are: low rheology, including plastic viscosity (PV), yield point (YP), gel strengths; minimal rheology variation between initial and heat aged properties; minimal fluid loss and minimal sag or settlement. Sag is quantified in the following examples by separately measuring the density of the top half and bottom half of an aged fluid sample, and a dimensionless factor calculated using the following equation:

Sag Factor=(density of the top half)/(density of the top half+density of the bottom half)

A factor of 0.50 indicates zero solids separation and a no density variation throughout the fluid sample. A sag factor greater than 0.52 is normally considered unacceptable solids separation.

EXAMPLE 3

In the following example, two 13.0 ppg fluid formulations are compared, one weighted with conventional API barite and the second weighted with polymer coated colloidal barite (PCC barite) made in accordance with the teachings of the present invention, as a 2.2 sg liquid slurry. Other additives in the formulation are included to provide additional control of pH, fluid loss, rheology, inhibition to reactive shale and claystones. These additives are available from M-I Drilling Fluids.

| PRODUCT | | Fluid A | Fluid B |
|---|---|---|---|
| PCC barite | lbs/bbl | 320.0 | |
| API barite | lbs/bbl | | 238.1 |
| Freshwater | lbs/bbl | 175.0 | 264.2 |
| Soda Ash | lbs/bbl | 0.4 | 0.4 |
| Celpol ESL | lbs/bbl | 3.5 | 4.2 |
| Flotrol | lbs/bbl | 3.5 | 0 |

-continued

| PRODUCT | | Fluid A | Fluid B |
|---|---|---|---|
| Defoam NS | lbs/bbl | 0.4 | 0 |
| KCl | lbs/bbl | 32.9 | 36.1 |
| Glydril; MC | lbs/bbl | 10.5 | 10.5 |
| Duotec NS | lbs/bbl | 0.1 | 1.4 |

The fluids were heat aged statically for 48 hrs at 104° F. with the following exemplary results.

| | Fluid A | | Fluid B | |
|---|---|---|---|---|
| FANN 35 Reading (120° F.) | Initial | Aged | Initial | Aged |
| 600 rpm | 56 | 62 | 73 | 65 |
| 300 rpm | 36 | 41 | 52 | 47 |
| 200 rpm | 28 | 33 | 42 | 39 |
| 100 rpm | 19 | 23 | 31 | 29 |
| 6 rpm | 5 | 7 | 11 | 10 |
| 3 rpm | 4 | 6 | 9 | 8 |
| PV (cps) | 20 | 21 | 21 | 18 |
| YP (lbs/100 sq. ft) | 16 | 20 | 31 | 29 |
| 10 sec gel (lbs/100 sq. ft) | 5 | 7 | 10 | 9 |
| 10 min gel (lbs/100 sq. ft) | 8 | 8 | | 12 |
| Sag Factor | | 0.50 | | 0.58 |

One of skill in the art should appreciate upon review of the above results that Fluid A, formulated with the polymer coated colloidal barite, had no solids separation with a sag factor of zero with a rheological profile much lower than a fluid weighted with conventional API barite.

EXAMPLE 4

In the following example, a 14.0 ppg Freshwater fluid was chosen to compare the properties of fluids formulated with a polymer coated colloidal barite; an uncoated colloidal barite and a conventional API barite. Fluid A was formulated with the polymer coated colloidal barite of this invention. Fluid B was formulated with conventional API barite. Fluid C was formulated with a commercial grade of non coated colloidal barite, of median particle size of 1.6 microns available from Highwood Resources Ltd., Canada. Post grinding addition of the coating polymer of the invention are included in the formulation of Fluids B and C to maintain the fluid in a deflocculated condition.

| PRODUCT | | Fluid A | Fluid B | Fluid C |
|---|---|---|---|---|
| PCC barite | lbs/bbl | 407 | | |
| API barite | lbs/bbl | | 300 | |
| Sparwite W-5HB | lbs/bbl | | | 310 |
| Freshwater | lbs/bbl | 182 | 276 | 274 |
| Idsperse XT | | | 6.0 | 6.2 |
| XCD Polymer | lbs/bbl | 0.5 | 0.6 | 0.5 |
| DUAL-FLO | lbs/bbl | 7 | 5 | 7 |
| Bentonite | lbs/bbl | 10 | 10 | 10 |

Samples of fluid A, B and C were purposely contaminated with bentonite to simulate the inclusion of naturally drilled solids in the formulation. The samples were heat aged dynamically at 150° F. for 16 hrs. Exemplary and representative results after aging are shown below.

| | Fluid A | | Fluid B | | Fluid C | |
|---|---|---|---|---|---|---|
| FANN 35 Reading (100° F.) | No Bentonite | With Bentonite | No Bentonite | With Bentonite | No Bentonite | With Bentonite |
| 600 rpm | 74 | 76 | 78 | 205 | 94 | off scale |
| 300 rpm | 48 | 49 | 51 | 129 | 58 | off scale |
| 200 rpm | 38 | 39 | 39 | 100 | 45 | |
| 100 rpm | 27 | 27 | 27 | 67 | 29 | |
| 6 rpm | 8 | 8 | 8 | 20 | 7 | |
| 3 rpm | 6 | 6 | 6 | 19 | 6 | |
| PV (cps) | 26 | 27 | 27 | 76 | 36 | |
| YP (lbs/100 sq. ft) | 22 | 22 | 24 | 53 | 22 | |
| 10 sec gel (lbs/100 sq. ft) | 7 | 6 | 6 | 17 | 6 | |
| 10 min gel (lbs/100 sq. ft) | 9 | 9 | 7 | 20 | 7 | |
| API Fluid Loss (ml/30 min) | 3.5 | 3.0 | 4 | | 3.9 | |

Upon review of the above data, one of skill in the art should appreciate that the properties of Fluid A remain essentially unchanged, while the Fluid B became very viscous, whereas, the rheology of Fluid C formulated with non coated colloidal barite after aging was too viscous to measure.

EXAMPLE 5

A further comparison between a polymer coated colloidal barite of this invention and conventional API barite was made in a 14 ppg fluid, in which the yield point of the fluid has been adjusted such that it is the same between the two fluids before ageing.

| PRODUCT | | Fluid A | Fluid B |
|---|---|---|---|
| PCC barite (2.4 sg) | lbs/bbl | 265 | |
| API barite | lbs/bbl | | 265 |
| Freshwater | lbs/bbl | 238 | 293 |
| Soda Ash | lbs/bbl | 0.5 | 0.5 |
| KOH | lbs/bbl | 0.5 | 0.5 |
| PolyPlus RD | lbs/bbl | 0.5 | 0.5 |
| PolyPac UL | | 2.0 | 2.0 |
| Duovis | lbs/bbl | 1.0 | 0.75 |
| KCl | lbs/bbl | 8.0 | 8.0 |

The fluids were heat aged dynamically for 16 hrs at 150° F. The following table presented exemplary results.

| | Fluid A | | Fluid B | |
|---|---|---|---|---|
| FANN 35 Reading (120° F.) | Initial | Aged | Initial | Aged |
| 600 rpm | 64 | 61 | 80 | 72 |
| 300 rpm | 42 | 39 | 50 | 43 |
| 200 rpm | 32 | 32 | 33 | 32 |
| 100 rpm | 22 | 21 | 24 | 21 |
| 6 rpm | 6 | 5 | 6 | 6 |
| 3 rpm | 4 | 4 | 4 | 4 |
| PV (cps) | 22 | 22 | 30 | 29 |
| YP (lbs/100 sq. ft) | 20 | 17 | 20 | 14 |
| 10 sec gel (lbs/100 sq. ft) | 5 | 5 | 5 | 5 |
| 10 min gel (lbs/100 sq. ft) | 17 | 11 | 6 | 6 |

-continued

| | Fluid A | | Fluid B | |
|---|---|---|---|---|
| FANN 35 Reading (120° F.) | Initial | Aged | Initial | Aged |
| API Fluid Loss (ml/30 min) | | 2.8 | | 4.7 |
| VST ppg | | 0.21 | | 1.33 |

Upon review of the above, one of skill in the art should understand that the plastic viscosity for the polymer coated colloidal barite fluids were lower and thus more desirable. The Viscometer Sag Test (VST) is an alternative method for determining sag; in drilling fluids and is described in American Society of Mechanical Engineers Magazine (1991) by D. Jefferson. As indicated above, the VST values for Fluid A, containing the polymer coated colloidal barite of this invention is lower than that of Fluid B formulated with untreated, API barite.

EXAMPLE 6

The long term thermal stability of the colloidal barite fluids of the present invention are shown in the following example at 17.34 ppg. ECF-614 additive is an organophilic clay additive available from M-I Drilling Fluids.

| PRODUCT | | Fluid A |
|---|---|---|
| PCC barite (2.4 sg) | lbs/bbl | 682 |
| Freshwater | lbs/bbl | 53.5 |
| ECF-614 | lbs/bbl | 2.0 |

The fluid was heat aged statically for 4 days at 350° F. The following table provides exemplary results.

| | Fluid A | |
|---|---|---|
| FANN 35 Reading (120° F.) | Initial | Aged |
| 600 rpm | 107 | 45 |
| 300 rpm | 64 | 28 |
| 6 rpm | 7 | 3 |
| 3 rpm | 5 | 2 |
| PV (cps) | 43 | 17 |
| YP (lbs/100 sq. ft) | 21 | 11 |
| 10 sec gel (lbs/100 sq. ft) | 6 | 4 |
| 10 min gel (lbs/100 sq. ft) | 10 | 11 |
| Sag Factor | | 0.503 |

Upon review of the above data one of skill in the art should understand and appreciate the long term thermal stability of the colloidal barite fluids of the present invention

EXAMPLE 7

This test was carried out to show the feasibility of 24 ppg [2.87 g/cm$^3$] slurries (0.577 Volume fraction). Each fluid contained the following components: fresh water 135.4 g, barite 861.0 g, IDSPERSE XT 18.0 g. The barite component was varied in composition according to the following table.

TABLE IV

| # | API grade barite (%) | Colloidal barite (%) |
|---|---|---|
| 9 | 100 | 0 |
| 10 | 90 | 10 |
| 11 | 80 | 20 |
| 12 | 75 | 25 |
| 13 | 60 | 40 |
| 14 | 0 | 100 |

TABLE V

| | Viscosity at various shear rates (rpm or agitation): Dial reading or "Fann Units" for: | | | | | | | | Plastic Viscosity | Yield Point lb/100 ft$^2$ |
|---|---|---|---|---|---|---|---|---|---|---|
| # | 600 | 300 | 200 | 117 | 100 | 59 | 30 | 6 | 3 | mPa·s | (Pascals) |
| 9 | *os | 285 | 157 | 66 | 56 | 26 | 10 | 3 | 2 | | |
| 10 | 245 | 109 | 67 | 35 | 16 | 13 | 7 | 3 | 2 | 136 | −27 (−13) |
| 11 | 171 | 78 | 50 | 28 | 23 | 10 | 7 | 3 | 2 | 93 | −15 (−7) |
| 12 | 115 | 55 | 36 | 19 | 17 | 8 | 5 | 3 | 2 | 60 | −5 (−2) |
| 13 | 98 | 49 | 34 | 21 | 20 | 14 | 10 | 4 | 3 | 49 | 0 |
| 14 | 165 | 84 | 58 | 37 | 32 | 22 | 18 | 5 | 3 | 81 | 3 (−1.5) |

*os = off-scale

The results provided table V show that API grade barite due to its particle size and the high volume fraction required to achieved high mud weights exhibit dilatancy i.e. high plastic and apparent viscosity and negative yield values.

Introduction of fine grade materials tends to stabilize the flow regime keep it laminar at higher shear rates: plastic viscosity decreases markedly and yield point changes from negative to positive. No significant increase in low-shear rate viscosity (@3 rpm) is caused by the colloidal barite.

These results show that the colloidal weight material of this invention may advantageously be used in conjunction with conventional API barite.

EXAMPLE 8

An eighteen (18) pound per gallon [2.15 g/cm$^3$] slurry of weighting agent according the present invention was formulated and subsequently contaminated with a range of common contaminants and hot rolled at 300° F. (148.9° C.). The rheological results of before (BHR) and after hot rolling (AHR) are presented below. The system shows excellent resistance to contaminants, low controllable rheology and gives fluid loss control under a standard API mud test as shown in following table VI: An equivalent set of fluids were prepared using API conventional barite without the polymer coating as a direct comparison of the two particle types. (Table VII)

TABLE VI (New barite)

| | Viscosity (Fann Units) at various shear rates (rpm of agitation: | | | | | | PV | YP lb/100 ft³ | Fluid loss |
|---|---|---|---|---|---|---|---|---|---|
| | 600 | 300 | 200 | 100 | 6 | 3 | mPa·s | (Pascals) | ml |
| no contaminant BHR | 21 | 11 | 8 | 4 | 1 | 1 | 10 | 1(0.5) | |
| no contaminant AHR | 18 | 10 | 7 | 4 | 1 | 1 | 8 | 2(1) | 5.0 |
| +80 ppb NaCl BHR | 41 | 23 | 16 | 10 | 2 | 1 | 18 | 5(2.5) | |
| +80 ppb NaCl AHR | 26 | 14 | 10 | 6 | 1 | 1 | 12 | 2(1) | 16 |
| +30 ppb OCMA¹ BHR | 38 | 22 | 15 | 9 | 2 | 1 | 16 | 6(3) | |
| +30 ppb OCMA AHR | 26 | 14 | 10 | 6 | 1 | 1 | 12 | 2(1) | 6.8 |
| +5 ppb Lime BHR | 15 | 7 | 5 | 3 | 1 | 1 | 8 | −1(−0.5) | |
| +5 ppb Lime AHR | 10 | 5 | 4 | 2 | 1 | 1 | 5 | 0 | 6.4 |

¹OCMA = Ocma clay, a fine particle ball clay commonly used to replicate drilled solids contamination acquired from shale sediments during drilling

TABLE VII (Conventional API barite)

| | Viscosity (Fann Units) at various shear rates (rpm of agitation: | | | | | | PV | YP lb/100 ft² | Fluid loss |
|---|---|---|---|---|---|---|---|---|---|
| | 600 | 300 | 200 | 100 | 6 | 3 | mPa·s | (Pascals) | ml |
| no contaminant BHR | 22 | 10 | 6 | 3 | 1 | 1 | 12 | −2 | |
| no contaminant AHR | 40 | 24 | 19 | 11 | 5 | 4 | 16 | 8 | Total¹ |
| +80 ppb NaCl BHR | 27 | 13 | 10 | 6 | 2 | 1 | 14 | −1 | |
| +80 ppb NaCl AHR | 25 | 16 | 9 | 8 | 1 | 1 | 9 | 7 | Total¹ |
| +30 ppb OCMA BHR | 69 | 55 | 49 | 43 | 31 | 26 | 14 | 31 | |
| +30 ppb OCMA AHR | 51 | 36 | 31 | 25 | 18 | 16 | 15 | 21 | Total² |
| +5 ppb Lime BHR | 26 | 14 | 10 | 6 | 2 | 1 | 12 | 2 | |
| +5 ppb Lime AHR | 26 | 14 | 10 | 6 | 1 | 1 | 12 | 2 | Total¹ |

¹Total fluid loss within 30 seconds
²Total fluid loss within 5 minutes.

A comparison of the two sets of data show that the weighting agent according the present invention (new barite) has considerable fluid loss control properties when compared to the API barite. The API barite also shows sensitivity to drilled solids contamination whereas the new barite system is more tolerant.

EXAMPLE 9

An experiment was conducted to demonstrate the ability of the new weighting agent to formulate drilling muds with densities above 20 pound per gallon [2.39 g/cm³].

Two twenty two pound per gallon [2.63 g/cm³] mud systems were formulated, the weighting agents comprised a blend of 35% w/w new barite weighting agent with 65% w/w API grade barite (Fluid #1) weighting agent and 100% API grade barite (fluid #2), both with 11.5 pound per barrel [32.8 kg/m³] STAPLEX 500 (mark of Schlumberger, shale stabilizer), 2 pound per barrel [5.7 kg/m³] IDCAP (mark of Schlumberger, shale inhibitor), and 3.5 pound per barrel [10 kg/m³] potassium chloride. The other additives provide inhibition to the drilling fluid, but here demonstrate the capacity of the new formulation to cope with any subsequent polymer additions. The fluid was hot rolled to 200° F. (93.3° C.). Results are provided in table VIII.

TABLE VIII

| | Viscosity (Fann Units) at various shear rates (rpm of agitation: | | | | | | PV | Yield Point lb/100 ft² | Fluid loss |
|---|---|---|---|---|---|---|---|---|---|
| | 600 | 300 | 200 | 100 | 6 | 3 | mPa·s | (Pascals) | ml |
| Before Hot Rolling (#1) | 110 | 58 | 46 | 30 | 9 | 8 | 52 | 6 (2.9) | |
| After Hot Rolling(#1) | 123 | 70 | 52 | 30 | 9 | 8 | 53 | 17 (8.1) | 8.0 |
| Before Hot Rolling (#2) | 270 | 103 | 55 | 23 | 3 | 2 | 167 | −64 (−32) | |
| After Hot rolling(#2) | os | 177 | 110 | 47 | 7 | 5 | | | 12.0 | os: off-scale

The 100% API grade barite has very high plastic viscosity and is in fact turbulent as demonstrated by the negative yield point. After hot rolling the rheology is so high that it is off scale.

EXAMPLE 10

This experiment demonstrates the ability of the new weighting agent of the present invention to lower the viscosity of fluids. The weighting agent is 100% colloidal barite according the present invention. Fluid 15 is based on synthetic oil (Ultidrill, Mark of Schlumberger, a linear alpha-olefin having 14 to 16 carbon atoms). Fluid 16 is a water-based mud and includes a viscosifier (0.5 ppb IDVIS, Mark of Schlumberger, a pure xanthan gum polymer) and a fluid loss control agent (6.6 ppb IDFLO Mark of Schlumberger). Fluid 15 was hot rolled at 200° F. (93.3° C.), fluid 16 at 250° F. (121.1° C.). After hot rolling results are shown table IX.

TABLE IX

| | Viscosity (Fann Units) at various shear rates (rpm of agitation: | | | | | | PV | Gels[1] lbs/100 ft² | Yield Point lbs/100 ft² |
|---|---|---|---|---|---|---|---|---|---|
| | 600 | 300 | 200 | 100 | 6 | 3 | mPa·s | (Pascals) | (Pascals) |
| #15: 13.6 ppg [1.63 g/cm³] | 39 | 27 | 23 | 17 | 6 | 5 | 12 | 7/11 | 15 |
| #16: 14 ppg [1.67 g/cm³] | 53 | 36 | 27 | 17 | 6 | 5 | 17 | 5/- | 19 |

[1] A measure of the gelling and suspending characteristics of the fluid, determined at 10 sec/10 min using a Fann viscosimeter.

Even though the formulation was not optimized, this test makes clear that the new weighting agent provides a way to formulate brine analogues fluids useful for slimhole applications or coiled tubing drilling fluids. The rheology profile is improved by the addition of colloidal particles.

EXAMPLE 11

An experiment was conducted to demonstrate the ability of the new weighting agent to formulate completion fluids, were density control and hence sedimentation stability is a prime factor. The weighting agent is composed of the new colloidal barite according to the present invention with 50 pound per barrel [142.65 kg/m³] standard API grade calcium carbonate, which acts as bridging solids. The 18.6 ppg [2.23 g/cm³] fluid was formulated with 2 pound per barrel [5.7 kg/m³] PTS 200 (mark of Schlumberger, pH buffer) The static aging tests were carried out at 400° F. (204.4° C.) for 72 hours. The results shown in the table below, before (BSA) and after (ASA) static aging reveal good stability to sedimentation and rheological profile.

| | Viscosity (Fann Units) at various shear rates (rpm of agitation: | | | | | | PV | YP lb/100 ft² | Free water * |
|---|---|---|---|---|---|---|---|---|---|
| | 600 | 300 | 200 | 100 | 6 | 3 | mPa·s | (Pascals) | ml |
| 18.6 ppg BSA | 37 | 21 | 15 | 11 | 2 | 1 | 16 | 5 (2.5) | — |
| 18.6 ppg ASA | 27 | 14 | 11 | 6 | 1 | 1 | 13 | 1 (0.5) | 6 |

* free water is the volume of clear water that appears on top of the fluid. The remainder of the fluid has uniform density.

EXAMPLE 12

This experiment demonstrates the ability of the new weighting agent to formulate low viscosity fluids and show it's tolerance to pH variations. The weighting agent is composed of the new colloidal barite according to the present invention. The 16 ppg [1.91 g/cm³] fluid was formulated with caustic soda to adjust the pH to the required level, with the subsequent fluid rheology and API filtration tested. The results shown in the table below reveal good stability to pH variation and rheological profile.

| PH | Viscosity (Fann Units) at various shear rates (rpm of agitation: | | | | | | PV mPa·s | Yield Point lbs/100 ft² (Pascals) | Fluid Loss ml |
|---|---|---|---|---|---|---|---|---|---|
| | 600 | 300 | 200 | 100 | 6 | 3 | | | |
| 8.01 | 14 | 7 | 5 | 3 | | | 7 | 0 (0) | 8.4 |
| 9.03 | 14 | 8 | 5 | 3 | | | 6 | 2 (1) | 8.5 |
| 10.04 | 17 | 9 | 6 | 3 | | | 8 | 1 (0.5) | 7.9 |
| 10.97 | 17 | 9 | 6 | 3 | | | 8 | 1 (0.5) | 7.9 |
| 12.04 | 19 | 10 | 7 | 4 | 1 | 1 | 9 | 1 (0.5) | 8.1 |

EXAMPLE 13

This experiment demonstrates the ability of the new weighting agent to formulate low rheology HTHP water base fluids. The weighting agent is composed of the new colloidal barite according to the present invention, with 10 pounds per barrel [28.53 kg/m³] CALOTEMP (mark of Schlumberger, fluid loss additive) and 1 pound per barrel [2.85 kg/m³] PTS 200 (mark of Schlumberger, pH buffer). The 17 ppg [2.04 g/m³] and 18 ppg [2.16 g/cm³] fluids were static aged for 72 hours at 250° F. (121° C.). The results shown in the table below reveal good stability to sedimentation and low rheological profile with the subsequent filtration tested.

| Density ppg | PH | Viscosity (Fann Units) at various shear rates (rpm of agitation: | | | | | | PV mPa·s | Yield Point lbs/100 ft² (Pascals) | Free Water ml | Fluid Loss ml |
|---|---|---|---|---|---|---|---|---|---|---|---|
| | | 600 | 300 | 200 | 100 | 6 | 3 | | | | |
| 17 | 7.4 | 28 | 16 | 11 | 6 | 1 | 1 | 12 | 4 (2) | 10 | 3.1 |
| 18 | 7.5 | 42 | 23 | 16 | 10 | 1 | 1 | 19 | 4 (2) | 6 | 3.4 |

EXAMPLE 14

This experiment illustrates the ability of the fluids formulated utilizing the polymer coated colloidal solid material s of the present invention to be pumped in a commercially available apparatus for injecting viscous brine fluids into a casing annulus as part of a casing annulus pressure control program. The test apparatus was an unmodified CARS™ unit commercially available from ABB Vetco, having 500 feet of hose on the reel, a small hose inner diameter of 0.2 inches, a hose fitting diameter of 0.1 inches, and a nylon ball of 0.25 inch diameter. A fluid in accordance with the present invention was formulated having a density of 21.5 ppg and pumped through the test unit in accordance with all the proper procedures. The following table summarizes exemplary data:

| Inlet Air Pressure (PSI) | Low Outlet Pressure (PSI) | High Outlet Pressure (PSI) | Total Flow (L) | Elapsed Time (min) | Calc Flow (GPM) | Comments |
|---|---|---|---|---|---|---|
| 130 | 1000 | 1700 | 1.3 | 4 | 0.12 | Nylon ball in nozzle |
| 130 | 1500 | 2000 | 1.7 | 2 | 0.32 | Nylon ball in nozzle |
| 130 | 1000 | 3000 | 1.4 | 2 | 0.26 | Nylon ball in nozzle |
| 130 | 1100 | 2900 | 1.4 | 2 | 0.26 | Nylon ball in nozzle |
| 130 | 1100 | 2900 | 1.3 | 2 | 0.25 | Nylon ball in nozzle w/VR Plug |
| 130 | 700 | 2900 | 0.9 | 2 | 0.17 | Nylon ball in nozzle w/VR Plug |
| 130 | 1000 | 3000 | 1.3 | 2 | 0.25 | VR Plug - No ball |
| 130 | 800 | 2200 | 1 | 2 | 0.19 | No Ball or VR Plug |
| 110 | 1400 | 2400 | 8 | 1:32 | 1.97 | Water, VR Plug, No Ball |

A similar test was carried out using a larger hose having a 0.670 inch inner diameter, a hose fitting of 0.25 inches inner diameter; a nozzle of 0.67 VPN and spring #H300385-46. A fluid in accordance with the present invention was formulated having a density of 21.5 ppg and pumped through the test unit in accordance with all the proper procedures. The following table summarizes exemplary data:

| Inlet Air Pressure (PSI) | Low Outlet Pressure (PSI) | High Outlet Pressure (PSI) | Total Flow (L) | Elapsed Time (min) | Calc Flow (GPM) | Comments |
|---|---|---|---|---|---|---|
| 80  | 1200 | 1800 | 8 | 2:16 | 1.33 | No nozzle or VR Plug |
| 60  | 700  | 1200 | 8 | 2:38 | 1.15 | No nozzle or VR Plug |
| 100 | 1750 | 2000 | 8 | 1:30 | 2.01 | No nozzle or VR Plug |
| 110 | 1600 | 2000 | 8 | 1:23 | 2.18 | No nozzle or VR Plug |
| 120 | 1800 | 2300 | 8 | 1:40 | 1.81 | Nozzle, Spring, No VR Plug |
| 110 | 1700 | 2000 | 8 | 1:33 | 1.95 | Nozzle, Spring, No VR Plug |
| 110 | 1700 | 2000 | 8 | 1:34 | 1.93 | Nozzle, Spring, No VR Plug |
| 110 | 1500 | 2300 | 8 | 1:44 | 1.74 | Nozzle, Spring, VR Plug |
| 110 | 1500 | 2100 | 8 | 1:49 | 1.66 | Nozzle, Spring, VR Plug |
| 110 | 1500 | 2200 | 8 | 1:53 | 1.8  | Nozzle, Spring, VR Plug |

One of ordinary skill in the art should understand and appreciate in view of the above data that fluids including the polymer dispersant coated colloidal barite of the present invention can be readily pumped and injected into the casing annulus using commercially available technologies. It should also be appreciated that in contrast that if one were to attempt a similar experiment with API barite or finely milled barite, the particle sizes and the viscosity of either fluids would substantially prevent obtaining the above results.

EXAMPLE 15

This experiment illustrates the compatibility of a 22.4-ppg fluid formulated in accordance with the teachings of the present invention with a 17.6 ppg field lignosulfonate annulus fluid. The compatibility test consisted of measuring the rheology of the colloidal barite test fluid sample at 100, 120 and 150° F. and then measuring the rheology of a 17.6-ppg lignosulfonate filed mud at 100, 120 and 150° F. The samples were then combined in the following ratios 75:25, 50:50 and 25:75 (colloidal barite test fluid to lignosulfonate mud) and once again the rheology was measured at the three temperatures listed. Exemplary data is provided below in the following tables:

| Sample | Colloidal barite solution (22.4 ppg) | | |
|---|---|---|---|
| Rheology Temp. ° F. | 100 | 120 | 150 |
| 600 rpm | 186 | 141 | 110 |
| 300 rpm | 94 | 74 | 60 |
| 200 rpm | 65 | 50 | 44 |
| 100 rpm | 37 | 31 | 27 |
| 3 rpm | 6 | 6 | 6 |
| 6 rpm | 5 | 5 | 5 |
| plastic viscosity (centipoise) | 92 | 67 | 50 |
| Yield Point (100 ft$^2$) | 2 | 7 | 10 |
| Gels, 10 Sec. | 5 | 5 | 5 |
| Gels, 10 min. | 11 | 11 | 12 |

| Sample | 17.6 Field Lignosulfonate Annulus Fluid | | |
|---|---|---|---|
| Rheology Temp. ° F. | 100 | 120 | 150 |
| 600 rpm | 103 | 90 | 76 |
| 300 rpm | 57 | 51 | 45 |
| 200 rpm | 42 | 37 | 52 |
| 100 rpm | 25 | 24 | 20 |
| 3 rpm | 4 | 4 | 4 |
| 6 rpm | 3 | 3 | 3 |
| plastic viscosity (centipoise) | 46 | 39 | 31 |
| Yield Point (100 ft$^2$) | 11 | 12 | 14 |
| Gels, 10 Sec. | 5 | 5 | 5 |
| Gels, 10 min. | 12 | 14 | 17 |

| Sample | 22.4 ppg Colloidal barite: 17.6 ppg Field Lignosulfonate 75:25 | | |
|---|---|---|---|
| Rheology Temp. ° F. | 100 | 120 | 150 |
| 600 rpm | 200 | 174 | 147 |
| 300 rpm | 116 | 99 | 87 |
| 200 rpm | 86 | 74 | 66 |
| 100 rpm | 53 | 46 | 42 |
| 3 rpm | 14 | 12 | 12 |
| 6 rpm | 11 | 10 | 10 |
| plastic viscosity (centipoise) | 84 | 75 | 60 |
| Yield Point (100 ft$^2$) | 32 | 24 | 27 |
| Gels, 10 Sec. | 17 | 15 | 14 |
| Gels, 10 min. | 57 | 57 | 60 |

| Sample | 22.4 ppg Colloidal barite: 17.6 ppg Field Lignosulfonate 50:50 | | |
| --- | --- | --- | --- |
| Rheology Temp. °F. | 100 | 120 | 150 |
| 600 rpm | 179 | 154 | 135 |
| 300 rpm | 102 | 90 | 82 |
| 200 rpm | 75 | 69 | 63 |
| 100 rpm | 45 | 43 | 41 |
| 3 rpm | 10 | 11 | 12 |
| 6 rpm | 8 | 9 | 10 |
| plastic viscosity (centipoise) | 77 | 64 | 53 |
| Yield Point (100 ft$^2$) | 25 | 26 | 29 |
| Gels, 10 Sec. | 13 | 12 | 16 |
| Gels, 10 min. | 50 | 52 | 58 |

| Sample | 22.4 ppg Colloidal barite: 17.6 ppg Field Lignosulfonate 25:75 | | |
| --- | --- | --- | --- |
| Rheology Temp. °F. | 100 | 120 | 150 |
| 600 rpm | 124 | 110 | 91 |
| 300 rpm | 72 | 65 | 55 |
| 200 rpm | 54 | 49 | 42 |
| 100 rpm | 33 | 31 | 28 |
| 3 rpm | 6 | 7 | 6 |
| 6 rpm | 5 | 6 | 5 |
| plastic viscosity (centipoise) | 52 | 45 | 36 |
| Yield Point (100 ft$^2$) | 20 | 20 | 19 |
| Gels, 10 Sec. | 7 | 10 | 11 |
| Gels, 10 min. | 26 | 31 | 32 |

Upon review and careful examination of the above data, one of skill in the art should understand and appreciate that the compatibility of the fluids at a test temperature of 100° F. It should also be noted that the PV decreases from the colloidal barite solution standard when mixed with the field sample. It was noted that the YP increase to a maximum of 32 100 ft/lbs$^2$, however, a skilled person would understand that is well within what would be considered pumpable. An increase in the gel strengths should also be noted, however, this also is within an acceptable range. Upon considering the entirety of the above data, one of skill in the art should be able to understand and appreciate the compatibility of the colloidal barite fluids of the present invention and lignosulfonate annulus fluids.

EXAMPLE 16

This experiment illustrates the ability of the fluids of the present invention to displace a 17.6 ppg field lignosulfonate annulus fluid. This test consisted of placing 50 mls of the 17.6 ppg lignosulfonate field mud in a 100 ml graduated cylinder. The 22.4 ppg colloidal barite fluid of the present invention was loaded into a 60 ml syringe with a 6" long blunt nose needle. The tip of the needle was placed inside the graduated cylinder to 5 ml below the 50 ml mark and the colloidal barite fluid was then injected into the field mud sample at a rate of about 50 ml/minute. The sample was then allowed to stand at room temperature for about 5 minutes. After the time had expired a hollow glass barrel was carefully inserted into the sample and run to bottom. The hollow glass barrel was then capped and pulled from the graduate cylinder in a manner to obtain a sample of the fluids in the graduated cylinder. By visual observation, one of skill in the art should notice that the bottom half of the hollow glass cylinder contains the colloidal barite fluid of the present invention. This can be determined visually by the color change from the colloidal barite fluid (light tan to white) to the field mud (very dark brown).

In order to quantify these findings the test was rerun but this time instead of running in the hollow glass cylinder, a 20 ml syringe with the long blunt nose needle was run in the sample. The needle was run to the bottom of the graduate cylinder were a 25 ml sample was extracted from the bottom of the graduated cylinder. This sample was then placed into a 20 ml picnometer and weighed on a Mettler bench top scale. The specific gravity of the sample was determined to be 2.694 which when converted is a density of 22.47 ppg. The original sample weight was 22.5 ppg One of skill in the art should understand and appreciate that this test demonstrates the ability of the colloidal barite solutions of the present invention to not only fall through the existing 17.6 ppg lignosulfonate filed sample quickly but also to remain intact and not be dispersed as it is falling through the field mud. The significance of this result should be appreciated by such a skilled artisan as an indication that little if any contamination and/or reduction in the density value of the colloidal barite fluids of the present invention occurs as a result of mixing. For this reason, one of skill in the art should understand and appreciate that injection of the colloidal barite fluids of the present invention into a casing annular space should result in minimal dilution of the colloidal barite fluid and the bottom up displacement of any fluids existing in the casing annulus.

While not intending to be bound by any specific theory of action, it is believed that the formation of the colloidal solid material by a high energy wet process, in which API Barite of median particle size of 25-30 micron is reduced to a median particle size of less than 2 microns, is more efficient when the milling is done at high density, normally greater than 2.1 sg, preferably at 2.5 sg. At these high densities, the volume or mass fraction of barite is very high. For example, at a specific gravity of 2.5, a 100 kgs of the final product contains about 78 kgs is barite. However, the resulting slurry still remains fluid. The presence of the surface active polymer during the course of the commination process is an important factor in achieving the results of the present invention. Further, the surface active polymer is designed to adsorb onto surface sites of the barite particles. In the grinder, where there is a very high mass fraction of barite, the polymer easily finds it way onto the newly formed particle surfaces. Once the polymer 'finds' the barite—and in the environment of the grinder it has every chance to do so—a combination of the extremely high energy environment in the wet grinding mill (which can reach 85 to 90 C inside the mill), effectively ensures that the polymer is 'wrapped' around the colloidal size barite. As a result of this process it is speculated that no polymer 'loops' or 'tails' are hanging off the barite to get attached, snagged, or tangled up with adjacent particles. Thus it is speculated that the high energy and shear of the grinding process ensures the polymer remains on the barite permanently and thus the polymer doesn't desorb, or become detached.

This theory of action is supported by the observation that adding the same polymer to the same mass fraction of colloidal barite at room temperature and mixing with the usual lab equipment results provides very different results. Under such conditions it is believed that polymer doesn't attach itself to the surface properly. This may be due to presence of a sphere of hydration or other molecules occupying the surface binding sites. As a result the polymeric dispersant is not permanently 'annealed' to the surface, and thus, the rheology of the suspension is much higher. It has also been observed that the suspension is not so resistant to other contaminants possibly because the polymer wants to detach itself from the barite and onto these more reactive sites instead.

In view of the above disclosure, one of ordinary skill in the art should understand and appreciate that one illustrative embodiment of the present invention includes a method of controlling the pressure of a casing annulus in a subterranean well. In one such illustrative method, the method includes, injecting into the casing annulus a composition including a base fluid, and a polymer coated colloidal solid material. The polymer coated colloidal solid material includes: a solid particle having an weight average particle diameter ($d_{50}$) of less than two microns, and a polymeric dispersing agent absorbed to the surface of the solid particle during the course of the commination process. The base fluid utilized in the above illustrative embodiment can be an aqueous fluid or an oleaginous fluid and preferably is selected from: water, brine, diesel oil, mineral oil, white oil, n-alkanes, synthetic oils, saturated and unsaturated poly(alpha-olefins), esters of fatty acid carboxylic acids and combinations and mixtures of these and similar fluids that should be apparent to one of skill in the art. Suitable and illustrative colloidal solids are selected such that the solid particles are composed of a material of specific gravity of at least 2.68 and preferably are selected from barium sulfate (barite), calcium carbonate, dolomite, ilmenite, hematite, olivine, siderite, strontium sulfate, combinations and mixtures of these and other suitable materials that should be well known to one of skill in the art. In one preferred and illustrative embodiment, the polymer coated colloidal solid material has a weight average particle diameter ($d_{50}$) less than 2.0 microns. Another illustrative embodiment contains at least 60% of the solid particles have a diameter less than 2 microns or alternatively more than 25% of the solid particles have a diameter less than 2 microns. The polymeric dispersing agent utilized in one illustrative and preferred embodiment is a polymer of molecular weight of at least 2,000 Daltons. In another more preferred and illustrative embodiment, the polymeric dispersing agent is a water soluble polymer is a homopolymer or copolymer of monomers selected from the group comprising: acrylic acid, itaconic acid, maleic acid or anhydride, hydroxypropyl acrylate vinylsulphonic acid, acrylamido 2-propane sulphonic acid, acrylamide, styrene sulphonic acid, acrylic phosphate esters, methyl vinyl ether and vinyl acetate, and wherein the acid monomers may also be neutralized to a salt.

Another illustrative embodiment of the present invention includes a method of controlling the pressure of a casing annulus in a subterranean well, the method including inserting into the casing annulus a sufficient amount of a flexible tubing so as to reach a predetermined depth, and pumping into the flexible tubing a pressure control composition so as to inject an effective amount of the pressure control composition into the casing annulus so as to substantially displace any existing fluid in the casing annulus. In such an illustrative embodiment, the pressure control composition includes: a base fluid, and a polymer coated colloidal solid material, in which the polymer coated colloidal solid material includes: a solid particle having an weight average particle diameter ($d_{50}$) of less than two microns, and a polymeric dispersing agent absorbed to the surface of the solid particle. Another illustrative embodiment contains at least 60% of the solid particles have a diameter less than 2 microns or alternatively more than 25% of the solid particles have a diameter less than 2 microns. One preferred and illustrative embodiment includes a base fluid that is an aqueous fluid or an oleaginous fluid and which is preferably selected from, water, brine, diesel oil, mineral oil, white oil, n-alkanes, synthetic oils, saturated and unsaturated poly(alpha-olefins), esters of fatty acid carboxylic acids and combinations and mixtures of these and other similar fluids that should be apparent to one of skill in the art. A preferred and illustrative embodiment includes solid particles composed of a material having a specific gravity of at least 2.68 and more preferably the colloidal solid is selected from barium sulfate (barite), calcium carbonate, dolomite, ilmenite, hematite, olivine, siderite, strontium sulfate and combinations and mixtures of these and other similar solids that should be apparent to one of skill in the art. The polymeric dispersing agent utilized in the present illustrative embodiment is preferably a polymer of molecular weight of at least 2,000 Daltons. Alternatively, the polymeric dispersing agent is a water soluble polymer is a homopolymer or copolymer of monomers selected from the group comprising: acrylic acid, itaconic acid, maleic acid or anhydride, hydroxypropyl acrylate vinylsulphonic acid, acrylamido 2-propane sulphonic acid, acrylamide, styrene sulphonic acid, acrylic phosphate esters, methyl vinyl ether and vinyl acetate, and wherein the acid monomers may also be neutralized to a salt.

In addition to the above illustrative methods, the present invention is also directed to a composition that includes a base fluid and a polymer coated colloidal solid material. The polymer coated colloidal solid material is formulated so as to include a solid particle having an weight average particle diameter ($d_{50}$) of less than two microns; and a polymeric dispersing agent coated onto the surface of the solid particle. One illustrative embodiment includes a base fluid that is either an aqueous fluid or an oleaginous fluid and preferably is selected from, water, brine, diesel oil, mineral oil, white oil, n-alkanes, synthetic oils, saturated and unsaturated poly(alpha-olefins), esters of fatty acid carboxylic acids, combinations and mixtures of these and other similar fluids that should be apparent to one of skill in the art. It is preferred in one illustrative embodiment that the solid particles are composed of a material of specific gravity of at least 2.68 and more preferably that the colloidal solid is selected from barium sulfate (barite), calcium carbonate, dolomite, ilmenite, hematite, olivine, siderite, strontium sulfate and combinations and mixtures of these and other similar solids that should be apparent to one of skill in the art. The polymer coated colloidal solid material utilized in one illustrative and preferred embodiment has a weight average particle diameter ($d_{50}$) less than 2.0 microns. Another illustrative embodiment contains at least 60% of the solid particles have a diameter less than 2 microns or alternatively more than 25% of the solid particles have a diameter less than 2 microns. A polymeric dispersing agent is utilized in a preferred and illustrative embodiment, and is selected such that the polymer preferably has a molecular weight of at least 2,000 Daltons. Alternatively the illustrative polymeric dispersing agent may be a water soluble polymer is a homopolymer or copolymer of monomers selected from the group comprising: acrylic acid, itaconic acid, maleic acid or anhydride, hydroxypropyl acrylate vinylsulphonic acid, acrylamido 2-propane sulphonic acid, acrylamide, styrene sulphonic acid, acrylic phosphate esters, methyl vinyl ether and vinyl acetate, and wherein the acid monomers may also be neutralized to a salt.

One of skill in the art should understand and appreciate that the present invention further includes a method of making the polymer coated colloidal solid material described above. Such an illustrative method includes grinding a solid particulate material and a polymeric dispersing agent for a sufficient time to achieve an weight average particle diameter ($d_{50}$) of less than two microns; and so that the polymeric dispersing agent is absorbed to the surface of the solid particle. Preferably the illustrative grinding process is carried out in the presence of a base fluid. The base fluid utilized in one illustrative embodiment is either an aqueous fluid or an oleaginous fluid and preferably is selected from, water, brine, diesel oil, mineral oil, white oil, n-alkanes, synthetic oils, saturated and unsaturated poly(alpha-olefins), esters of fatty acid carboxylic acids and combinations thereof. In one illustrative embodiment the solid particulate material is selected from materials having of specific gravity of at least 2.68 and preferably the solid particulate material is selected from barium sulfate (barite), calcium carbonate, dolomite, ilmenite, hematite, olivine, siderite, strontium sulfate, combinations and mixtures of these and other similar solids that should be apparent to one of skill in the art. The method of the present invention involves the grinding the solid in the presence of a polymeric dispersing agent. Preferably this polymeric dispersing agent is a polymer of molecular weight of at least 2,000 Daltons. The polymeric dispersing agent in one preferred and illustrative agent is a water soluble polymer that is a homopolymer or copolymer of monomers selected from the group comprising: acrylic acid, itaconic acid, maleic acid or anhydride, hydroxypropyl acrylate vinylsulphonic acid, acrylamido 2-propane sulphonic acid, acrylamide, styrene sulphonic acid, acrylic phosphate esters, methyl vinyl ether and vinyl acetate, and wherein the acid monomers may also be neutralised to a salt.

It should also be appreciated by one of skill in the art that the product of the above illustrative process is considered part of the present invention. As such one such preferred embodiment includes the product of the above illustrative process in which the polymer coated colloidal solid material has a weight average particle diameter ($d_{50}$) less than 2.0 microns. Another illustrative embodiment contains at least 60% of the solid particles have a diameter less than 2 microns or alternatively more than 25% of the solid particles have a diameter less than 2 microns.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A method of treating a wellbore, the method comprising:
    circulating a wellbore fluid in the wellbore, wherein the wellbore fluid comprises an oleaginous base fluid and a wellbore additive colloidal solid material,
        wherein the wellbore additive colloidal solid material is formed by grinding a solid particulate material and a polymeric dispersing agent for a sufficient time so that the polymeric dispersing agent is absorbed to the surface of the resulting colloidal solid particles,
        wherein the grinding is carried out in the presence of an oleaginous base fluid and a dispersing agent selected from the group consisting of oleic acid, polybasic fatty acids, alkylbenzene sulphonic acids, alkane sulphonic acids, linear alpha-olefin sulphonic acids, the alkaline earth metal salts of any of the above acids, phospholipids, synthetic polymers, and combinations thereof, and
        wherein the grinding is carried out so that the wellbore additive colloidal solid material has a weight average particle diameter $d_{90}$ less than 2.0 microns.

2. The method of claim 1, further comprising selecting the solid particulate material to have specific gravity of at least 2.68.

3. The method of claim 1, wherein the base fluid is selected from diesel oil, mineral oil, white oil, n-alkanes, synthetic oils, saturated and unsaturated polyalphaolefins, esters of fatty acid carboxylic acids and combinations thereof.

4. The method of claim 1, wherein the grinding is carried out so that the colloidal solid material has a weight average particle diameter $d_{50}$ of less than 1.5 microns.

5. A method of treating a wellbore, the method comprising:
    circulating a wellbore fluid in the wellbore, wherein the wellbore fluid comprises an base fluid and a wellbore additive colloidal solid material,
        wherein the wellbore additive colloidal solid material is formed by grinding a solid particulate material and a polymeric dispersing agent for a sufficient time so that the polymer dispersing agent is absorbed to the surface of the resulting colloidal solid particles,
        wherein the gringing is carried out in the presence of an aqueous base fluid and a dispersing agent comprises a homopolymer or copolymer of any monomers selected from the group consisting of acrylic acid, itaconic, maleic acid, maleic anhydride, hydroxypropyl acrylate vinylsulphonic acid, acrylamide 2-propane sulphonic acid, acrylamide, styrene sulphonic acid, acrylic phosphate esters, methyl vinyl ether, vinyl acetate, and combinations thereof, and
        wherein the grinding is carried out that the wellbore additive colloidal solid material has a weight average particle diameter $d_{90}$ less than 2.0 microns.

6. The method of claim 5, further comprising selecting the solid particulate material to have specific gravity of at least 2.68.

7. The method of claim 5, wherein the base fluid is selected from diesel oil, mineral oil, white oil, n-alkanes, synthetic oils, saturated and unsaturated polyalphaolefins, esters of fatty acid carboxylic acids and combinations thereof.

8. The method of claim 5, wherein the polymeric dispersing agent is a polymer of molecular weight in the range of 10,000 to 200,000.

9. The method of claim 5, wherein the grinding is carried out so that the colloidal solid material has a weight average particle diameter $d_{50}$ of less than 1.5 microns.

* * * * *